US009313336B2

(12) United States Patent
Ganong, III et al.

(10) Patent No.: US 9,313,336 B2
(45) Date of Patent: Apr. 12, 2016

(54) SYSTEMS AND METHODS FOR PROCESSING AUDIO SIGNALS CAPTURED USING MICROPHONES OF MULTIPLE DEVICES

(75) Inventors: William F. Ganong, III, Brookline, MA (US); David Mark Krowitz, Reading, MA (US)

(73) Assignee: Nuance Communications, Inc., Burlington, MA (US)

(*) Notice: Subject to any disclaimer, the term of this patent is extended or adjusted under 35 U.S.C. 154(b) by 944 days.

(21) Appl. No.: 13/187,914

(22) Filed: Jul. 21, 2011

(65) Prior Publication Data

US 2013/0022216 A1   Jan. 24, 2013

(51) Int. Cl.
*H04R 3/00* (2006.01)
*H04M 3/56* (2006.01)

(52) U.S. Cl.
CPC .......... *H04M 3/569* (2013.01); *H04M 2207/18* (2013.01)

(58) Field of Classification Search
CPC ...... H04R 3/005; H04R 1/406; H04R 25/407; H04R 3/568
See application file for complete search history.

(56) References Cited

U.S. PATENT DOCUMENTS

| | | |
|---|---|---|
| 5,333,275 A | 7/1994 | Wheatley et al. |
| 5,382,972 A | 1/1995 | Kannes |
| 5,995,936 A | 11/1999 | Brais et al. |
| 6,260,011 B1 | 7/2001 | Heckerman et al. |
| 6,477,491 B1 | 11/2002 | Chandler et al. |
| 6,535,848 B1 | 3/2003 | Ortega et al. |
| 6,748,361 B1 | 6/2004 | Comerford et al. |
| 6,816,468 B1 | 11/2004 | Cruickshank |
| 6,829,603 B1 | 12/2004 | Chai et al. |
| 7,142,666 B1 | 11/2006 | Bates et al. |
| 7,162,692 B2 | 1/2007 | Bodin et al. |
| 7,219,123 B1 | 5/2007 | Fiechter et al. |
| 7,243,060 B2 | 7/2007 | Atlas et al. |
| 7,287,221 B2 | 10/2007 | Bodin et al. |
| 7,295,970 B1 | 11/2007 | Gorin et al. |
| 7,567,908 B2 | 7/2009 | Bodin et al. |
| 7,830,408 B2 | 11/2010 | Asthana et al. |
| 8,332,220 B2 | 12/2012 | Bodin et al. |
| 8,504,364 B2 | 8/2013 | Bodin et al. |
| 8,781,830 B2 | 7/2014 | Bodin et al. |
| 2002/0003547 A1 | 1/2002 | Wang et al. |

(Continued)

OTHER PUBLICATIONS

Font, Multi-Microphone Signal Processing for Automatic Speech Recognition in Meeting Rooms, Jun. 15, 2005, Berkeley, California.

(Continued)

*Primary Examiner* — Joseph Saunders, Jr.
*Assistant Examiner* — James Mooney
(74) *Attorney, Agent, or Firm* — Wolf, Greenfield & Sacks, P.C.

(57) ABSTRACT

Systems, methods and apparatus for capturing at least one audio signal using a plurality of microphones that generate a plurality of representations of the at least one audio signal. In some embodiments, the plurality of microphones are disposed in a multiple-microphone setting so that the at least one audio signal is captured by at least two of the plurality of microphones. In some embodiments, at least one of the plurality of microphones is a microphone of a mobile device. The plurality of representations of the at least one audio signal may be processed to obtain a processed representation of the at least one audio signal.

16 Claims, 8 Drawing Sheets

(56) References Cited

U.S. PATENT DOCUMENTS

| | | |
|---|---|---|
| 2003/0050777 A1 | 3/2003 | Walker |
| 2003/0071833 A1 | 4/2003 | Dantzig et al. |
| 2003/0120793 A1 | 6/2003 | Marjola |
| 2003/0208473 A1 | 11/2003 | Lennon |
| 2004/0064317 A1 | 4/2004 | Othmer et al. |
| 2004/0076435 A1 | 4/2004 | Stolyarov et al. |
| 2004/0117186 A1 | 6/2004 | Ramakrishnan et al. |
| 2004/0153504 A1 | 8/2004 | Hutchinson et al. |
| 2004/0172252 A1 | 9/2004 | Aoki et al. |
| 2004/0204939 A1 | 10/2004 | Liu et al. |
| 2005/0060153 A1 | 3/2005 | Gable et al. |
| 2005/0132273 A1 | 6/2005 | Bodin et al. |
| 2005/0180582 A1* | 8/2005 | Guedalia .................. 381/92 |
| 2005/0249360 A1* | 11/2005 | Adcock et al. ............. 381/92 |
| 2006/0277465 A1 | 12/2006 | Pandit et al. |
| 2008/0172227 A1 | 7/2008 | Bodin et al. |
| 2009/0135741 A1 | 5/2009 | Mykhalchuk et al. |
| 2009/0238377 A1* | 9/2009 | Ramakrishnan et al. ....... 381/92 |
| 2009/0264114 A1* | 10/2009 | Virolainen et al. ........... 455/416 |
| 2010/0020951 A1 | 1/2010 | Basart et al. |
| 2011/0112833 A1 | 5/2011 | Frankel et al. |
| 2011/0301730 A1* | 12/2011 | Kemp et al. .................. 700/94 |
| 2012/0262533 A1 | 10/2012 | Gannu et al. |
| 2013/0013307 A1 | 1/2013 | Bodin et al. |
| 2013/0022189 A1 | 1/2013 | Ganong, III et al. |
| 2013/0024196 A1 | 1/2013 | Ganong, III et al. |
| 2014/0188469 A1 | 7/2014 | Bodin et al. |

OTHER PUBLICATIONS

Lai et al., Multiple-Microphone Time-Varying Filters for Robust Speech Recognition, Proceedings of the 2004 IEEE International Conference on Acoustics, Speech, and Signal Processing, p. 233-236, 2004.

Obuchi, Multiple-Microphone Robust Speech Recognition Using Decoder-Based Channel Selection, Workshop on Statistical and Perceptual Audio Processing SAPA-2004, Oct. 3, 2004, Jeju, Korea.

Freire et al., WebViews: Accessing Personalized Web Content and Services, Hong Kong, 2001, ACM, pp. 576-586.

\* cited by examiner

SYSTEMS AND METHODS FOR PROCESSING AUDIO SIGNALS CAPTURED USING MICROPHONES OF MULTIPLE DEVICES

BACKGROUND

There are circumstances where it is desirable to capture audio content in a meeting environment in which multiple participants are speaking. Examples include telephone conferences and circumstances where it may be desired to capture the audio to memorialize the meeting, for instance, by producing a meeting transcript using automatic speech recognition (ASR) techniques.

Capturing high quality audio for a meeting with multiple speakers can be challenging. For example, a single microphone may not be capable of capturing high quality audio from all speakers. Even if a single microphone may be used to capture suitably high quality audio from all speakers, it may be difficult to distinguish between different speakers because their utterances are captured on a single audio channel using the same microphone. To address some of these issues, wearable microphones have been made available in some conference rooms, so that each speaker may be provided with a dedicated microphone. In other settings, an array of microphones has been provided in some conference rooms to capture audio from multiple speakers in the room.

SUMMARY

Systems, methods and apparatus are provided for processing audio signals captured using device microphones.

In accordance with some embodiments, a method is provided, comprising acts of: capturing at least one audio signal using a plurality of microphones that generate a plurality of representations of the at least one audio signal, the plurality of microphones being disposed in a multiple-microphone setting so that the at least one audio signal is captured by at least two of the plurality of microphones, at least one of the plurality of microphones being a microphone of a mobile device; and processing the plurality of representations of the at least one audio signal to obtain a processed representation of the at least one audio signal.

In accordance with some further embodiments, at least one non-transitory computer readable medium is provided, having encoded thereon computer executable instructions for causing at least one computer to perform a method comprising acts of: capturing at least one audio signal using a plurality of microphones that generate a plurality of representations of the at least one audio signal, the plurality of microphones being disposed in a multiple-microphone setting so that the at least one audio signal is captured by at least two of the plurality of microphones, at least one of the plurality of microphones being a microphone of a mobile device; and processing the plurality of representations of the at least one audio signal to obtain a processed representation of the at least one audio signal.

In accordance with some further embodiments, a system is provided, comprising at least one processor programmed to: capture at least one audio signal using a plurality of microphones that generate a plurality of representations of the at least one audio signal, the plurality of microphones being disposed in a multiple-microphone setting so that the at least one audio signal is captured by at least two of the plurality of microphones, at least one of the plurality of microphones being a microphone of a mobile device; and process the plurality of representations of the at least one audio signal to obtain a processed representation of the at least one audio signal.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not necessarily drawn to scale. For purposes of clarity, not every component may be labeled in every drawing.

DETAILED DESCRIPTION

Figure 1A:
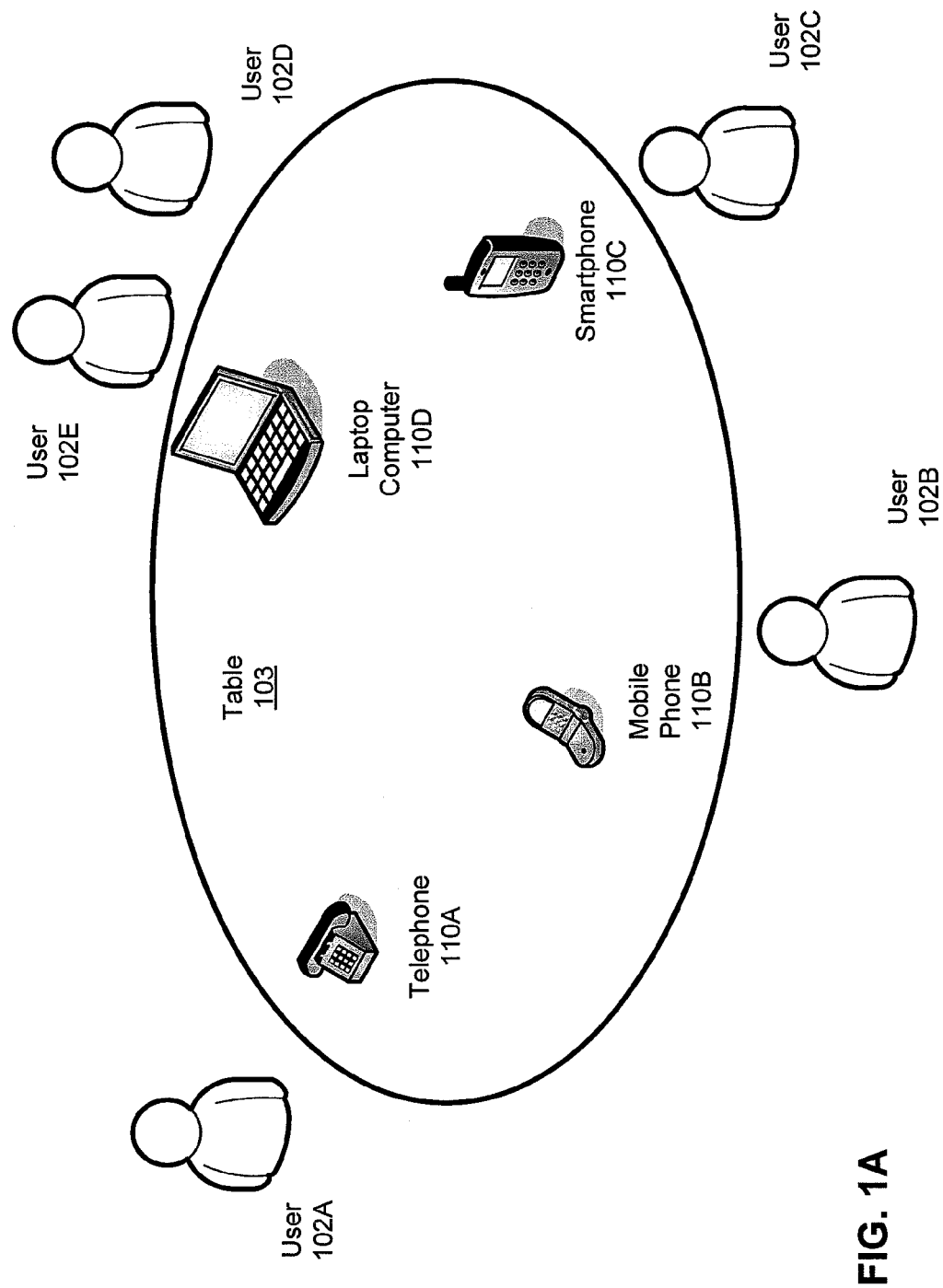
FIG. 1A shows an example of an illustrative meeting environment in which multiple devices having microphones are arranged in an ad hoc configuration to capture audio from multiple speakers, in accordance with some embodiments.

The inventors have recognized and appreciated that providing dedicated microphones or microphone arrays for meeting rooms can be costly. For example, such equipment may be expensive to purchase, install, and maintain. Also, requiring meeting participants to wear dedicated microphones may be disruptive. As a result, many meeting rooms are equipped with neither dedicated microphones nor microphone arrays.

The inventors have further recognized and appreciated that many participants bring to meetings devices that are equipped with on-board microphones and/or jacks for connecting with external microphones. Examples of such devices include, but are not limited to, mobile phones, laptop computers, tablet computers, and the like. Therefore, it may be possible to use devices from two or more participants to simultaneously record multiple channels of audio during a meeting.

It should be appreciated that a channel of audio is not limited to a raw audio signal captured by a microphone, but may also be an enhanced audio signal obtained by processing a raw audio signal, for example, to remove noise. As another example, a channel of audio may be a "pseudo" channel obtained by processing one or more raw audio signals, for example, to focus on a single speaker.

The inventors have further recognized and appreciated that many devices brought to meetings by participants are capable of establishing a communication link and transmitting audio signals over the communication link. For example, a mobile phone may be configured to transmit audio signals over a cellular network according to some suitable mobile telephony standard (e.g., CDMA and GSM). As another example, a laptop computer may be configured to transmit audio signals over the Internet according to some suitable communication protocol (e.g., VoIP).

As yet another example, a phone and/or computer may be capable of transferring information over a local wired or wireless network to another computer, such as a server in an enterprise that includes the meeting faculty (e.g., a server of a company having a conference room) such that the server may collect audio signals from multiple devices in the meeting room. Thus, using one or more of these communication mechanisms, audio signals captured during a meeting by participants' devices can be transmitted to a server that is configured to apply one or more multichannel signal processing techniques to the audio signals to perform any of numerous functions. Those functions can include creating high quality audio representations of speakers in the meeting (e.g., by identifying and focusing on a speaker's utterances and filtering out other sounds such as background noise and/or utterances of other speakers) for transmission to a remote participant in the meeting (e.g., a conference call participant) or to one or more ASR engines. Those functions can also include creating separate audio channels for each speaker and/or identifying individual speakers.

Accordingly, in some embodiments, systems and methods are provided for processing audio signals captured using an ad hoc set of device microphones, without using any conventional microphone array that has a fixed geometric arrangement of microphones. The devices may be mobile devices that are personal to meeting participants (e.g., owned by a participant or, provided by another entity such as the participant's employer and assigned to the participant for exclusive use, etc.). The captured audio signals may each include a component signal from a common audio source and may be analyzed to obtain an audio signal having a desired quality for the common audio source. For example, the device microphones may be associated with devices brought by one or more meeting participants to the meeting, and the common audio source may be a human speaker at the meeting.

Unlike conventional microphone arrays that rely upon a fixed geometry of the microphones in the array, and unlike conventional dedicated microphones attached to individual speakers, an ad hoc arrangement of microphones may, in some embodiments, be formed using a collection of devices that is unknown prior to the beginning of a meeting. For example, some or all of the devices may be personal devices (e.g., phones, laptop computers, tablet computers, etc.) brought by meeting participants, so that the number and types of available devices may be unknown prior to the beginning of the meeting.

In some further embodiments, an ad hoc arrangement of microphones may be formed using a collection of devices arranged in an unknown manner. For example, any number of devices and/or associated external microphones may be placed on a conference table of any suitable shape (e.g., round, oval, rectangular, etc.), and at any suitable angle and/or distance from each other. In other embodiments, meeting participants may be encouraged to attempt to arrange the devices in a desired pattern, for example, by spacing the devices roughly equally around the conference table. Such an arrangement may still be considered "ad hoc," because the geometry is not fixed.

In some embodiments, audio signals captured by multiple devices in an ad hoc arrangement may be transmitted to a meeting server so that two or more audio signals from different devices can be analyzed in conjunction with each other. For example, two or more audio signals captured by different devices may be compared against each other so as to select an audio signal having a desired quality with respect to a common audio source. As another example, a multichannel enhancement technique (e.g., beamforming, blind source separation, meeting diarization, etc.) may be applied to audio signals captured by different devices to emphasize an audio signal corresponding to the common audio source and/or deemphasize audio signals corresponding to noise and/or reverberation. For instance, a delay and sum beamforming technique may be used to delay one or more of the captured audio signals by some respective amount and the resulting signals may be summed to obtain a derived signal that emphasizes the common audio source. Other suitable multichannel enhancement techniques may also be used, as aspects of the present disclosure are not limited to any particular multichannel enhancement technique.

In some further embodiments, audio signals captured by different devices may be transmitted to, and received by, a meeting server in different manners (e.g., over different types of communication media). For example, an audio signal captured by a mobile phone may be transmitted over a telephone network, whereas an audio signal captured by a laptop computer may be transmitted over the Internet. Although telephone traffic and Internet traffic may traverse similar physical infrastructures such as cellular networks, communication satellites, fiber-optic cables, and/or microwave transmission links, they are handled according to different communication protocols. As a result, the audio signals may be formatted differently for transmission and/or routed through different communication paths. By contrast, a conventional microphone array rely on a common, pre-existing audio transmission infrastructure to transmit audio signals captured by different microphones.

As discussed above, one application for the techniques described herein is in connection with a system that uses ASR to provide a written transcript of all or part of a meeting. ASR performance for a multi-speaker setting may be improved using speaker-dependent models to process each individual speaker's voice. Speaker identification can be performed in any suitable way, as aspects of the present disclosure are not limited to any particular method of speaker identification.

In some embodiments, the system (e.g., a server that receives audio signals from the ad hoc set of microphones) may use one or more techniques (examples of which are discussed in greater detail below) to associate a device with a specific person, such as the owner of the device. This association may be done, for example, during a setup phase when the device signs in, registers with, or otherwise establishes a connection with the system (e.g., a server that will receive audio for the meeting and is referred to herein as a "meeting server"). If, at some point during the meeting, it is determined that any particular device is providing the best quality speech signal, the system may assume that the speaker is located closest to this device and therefore is likely the person that was associated with the device during the setup phase. However, it should be appreciated that the present disclosure does not require a setup phase during which a device is associated with a person, as other ways of association may also be suitable.

As discussed above, another application for multi-microphone settings is in connection with one or more remote participants (e.g., in a conference call). The inventors have further recognized and appreciated that, in such an application, multichannel signal processing techniques may be used to provide real-time information to meeting participants to facilitate clear and orderly communication. For example, when multiple speakers speak simultaneously during a discussion, the system (e.g., the meeting server) may use one or more multichannel signal processing techniques to select a leading speaker (e.g., by identifying a speaker whose speech is most prominently captured or using some other suitable rule or combination of rules). The system may give the floor of the meeting to the leading speaker in any suitable manner, for example, by playing only the speech from the leading speaker to other remote participants, by displaying an identification (e.g., visually or otherwise) of the leading speaker to offer a clue to the other speakers to stop speaking until the leading speaker has finished, or in any other suitable way. This feature may be particularly helpful to a remote participant, who may have difficulty following the discussion when overlapping speech from multiple speakers becomes jumbled.

It should be appreciated that various concepts introduced above and discussed in greater detail below may be implemented in any of numerous ways, as the disclosed concepts are not limited to any particular manner of implementation. Some illustrative implementations are described below. However, subject matter disclosed herein is not limited to the particular implementations shown in the various figures and described below, as other implementations are also possible. The below examples of specific implementations and applications are provided solely for illustrative purposes.

FIG. 1A shows an example of an illustrative meeting environment in which multiple devices having microphones are arranged in an ad hoc configuration to capture audio from multiple speakers, in accordance with some embodiments. In this example, a number of meeting participants (e.g., users 102A-E) are present in a conference room and are seated around a table (e.g., table 103). However, it should be appreciated that other seating arrangements may also be suitable, such as a panel of speakers sitting on a stage and facing audience members sitting in one or more rows of seats.

In the example shown in FIG. 1A, multiple devices (e.g., telephone 110A, mobile phone 110B, smartphone 110C, and laptop computer 110D) may be placed on the table 103. Each of these devices may be equipped with one or more microphones (on-board and/or external) configured to capture audio signals. Although not shown, other devices equipped with microphones may also be used to capture audio signals and may be located elsewhere in the conference room. For example, some of the other devices may be personal devices carried by respective meeting participants (e.g., held in their hands or pockets). As discussed in greater detail below in connection with FIG. 1B, the audio signals captured by telephone 110A, mobile phone 110B, smartphone 110C, and laptop computer 110D, and/or any other device may, in some embodiments, be transmitted to a server for processing.

It should be appreciated that, while some of the devices used to capture audio signals may be personal to respective meeting participants, other devices may not be. For example, the telephone 110A may be a conventional telephone installed in the conference room. Furthermore, some of the devices may be shared by multiple participants. For instance, in the example shown in FIG. 1A, the laptop computer 110D may be shared by at least two users 102D-E. Conversely, depending on how the devices are arranged relative to the meeting participants, utterances from multiple participants may be captured by the same microphone.

Figure 1B:
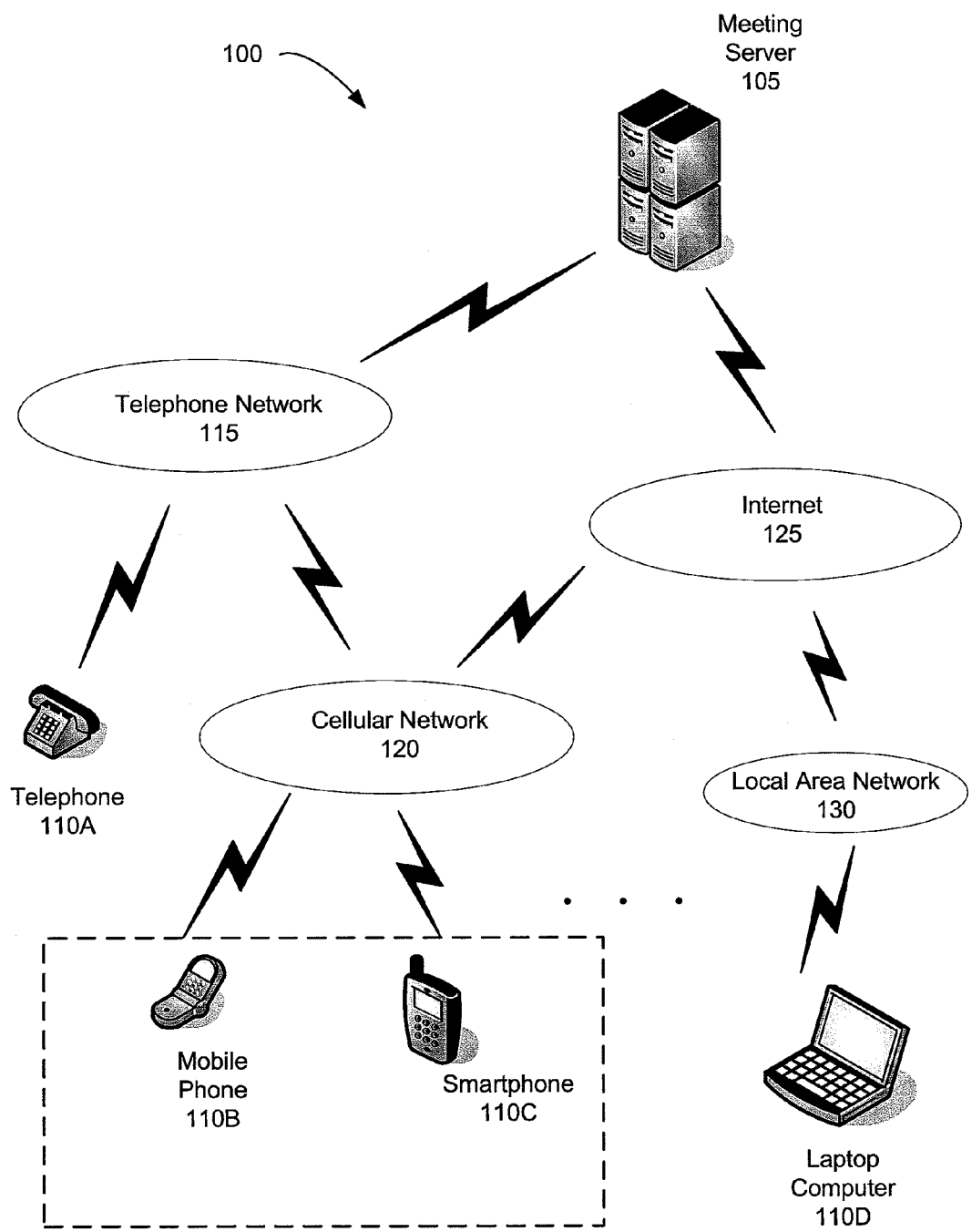
FIG. 1B shows an example of an illustrative system comprising a meeting server that receives from multiple devices having microphones multiple channels of audio recorded at a meeting, in accordance with some embodiments.

FIG. 1B shows an example of an illustrative system 100 in which the above-discussed concepts may be implemented. The system 100 comprises a meeting server 105 configured to process audio signals from a meeting. In various embodiments, the meeting server 105 may be a single server or a collection of servers that collectively provide the below described functions in any suitable way. In yet some further embodiments, the meeting server 105 may itself host an application that makes use of multiple microphone audio input, or may serve as a front end to one or more other servers that host the application. For instance, in some embodiments the meeting server 105 may be configured to perform ASR processing on the audio signals to create a transcript of the meeting, or serve as a front end to another server that does. Additionally, or alternatively, the meeting server 105 may provide an online meeting application (e.g., a WebEx™ or other application) that allows live meeting participation from different locations by streaming audio and/or video via the Internet, or serve as a front end to another server that does. In some embodiments, an ASR capability may be integrated into the online meeting application so that the streamed audio and/or video may be accompanied by corresponding transcribed text.

In some embodiments, the audio signals analyzed by the meeting server 105 may be provided by microphones of one or more devices (e.g., telephone 110A, mobile phone 110B, smartphone 110C, and laptop computer 110D) that are physically located at or near a meeting site (e.g., in a conference room) and placed at one or more appropriate locations so as to capture the audio signals. For instance, in the example of FIG. 1A, the telephone 110A, mobile phone 110B, smartphone 110C, and laptop computer 110D may be placed on a conference room table. However, as meeting participants may participate from different locations, some devices may, in other embodiments, be located remotely from other devices. For instance, instead of being located in the same conference room as shown in the example of FIG. 1A, the mobile phone 110B and smartphone 110C may be located in one conference room, while the telephone 110A and laptop computer 110D may be located remotely from that conference room.

The devices 110A-D may use any suitable mechanisms, or combinations of mechanisms, to communicate with the meeting server 105. For instance, in the example of FIG. 1B, the telephone 110A may be a fixed land line telephone and may transmit audio signals to the meeting server 105 via a telephone network 115 (e.g., the Public Switched Telephone Network, or PSTN). The telephone network 115 may comprise a plurality of subnetworks with different characteristics. For example, different subnetworks may employ different techniques to encode audio signals for transmission, so that the audio signals transmitted from the telephone 110A may be encoded, decoded, or otherwise transformed one or more times as they travel through different subnetworks. Furthermore, while the telephone network 115 may be digital for the most part, one or more portions may remain analog. As a result, the audio signals transmitted from the telephone 110A may be converted from analog to digital, or vice versa, one or more times during transmission.

As another example, the mobile phone 110B may transmit audio signals to the meeting server 105 via a cellular network 120, which may include a plurality of base stations configured to communicate with mobile phones present within the respective cells of the base stations. The cellular network 120 may also include other physical infrastructure such as switching centers to allow communication between different base stations. The cellular network 120 may also be connected to the telephone network 115, so that a call can be placed from a mobile phone to a fixed line phone or another mobile phone on a different cellular network. Thus, in the example of FIG. 1B, audio signals transmitted from the mobile phone 110B may first reach a nearby base station, which may forward the audio signals through the cellular network 120 and the telephone network 115, ultimately reaching the meeting server 105.

As yet another example, the smartphone 110C may also transmit audio signals to the meeting server 105 via the cellular network 120. Like the mobile phone 110B, the smartphone 110C may be capable of transmitting the audio signals as telephone traffic. Additionally, the smartphone 110C may be capable of transmitting the audio signals as data traffic, in which case the audio signals may be forwarded through a data network (e.g., the Internet 125), rather than the telephone network 115. In some embodiments, the audio signals are transmitted as data traffic, rather than telephone traffic, because the telephone network may require that the audio signals be compressed prior to transmission, thereby lowering the quality of the audio signals received by the meeting server 105. By contrast, transmitting the audio signals as data traffic may allow transmission of raw audio signals captured by a microphone and/or the use of compression techniques that better preserve signal quality. Furthermore, some audio signals transmitted as telephone traffic may be subject to automatic gain control, where a gain level may be unknown and variable. Therefore, it may be more desirable to transmit audio signals as data traffic, where automatic gain control may be disabled and/or more information regarding the gain level may be available. However, it should be appreciated that smartphones are not required to transmit audio signals as data traffic and may instead select a suitable communication mechanism depending on any number of factors (e.g., user preference, network conditions, etc.).

As yet another example, the laptop computer 110D may transmit audio signals to the meeting server 105 via a local area network 130 and the Internet 125. For example, in some embodiments, the laptop computer 110D may have a wired connection (e.g., an Ethernet connection) to the local area network 130, so that audio signals transmitted from the laptop computer 110D may first reach a network hub, which may forward the audio signals through the local area network 130 and the Internet 125, ultimately reaching the meeting server 105. Alternatively, the laptop computer 110D may have a wireless connection (e.g., an IEEE 802.11 connection) to the local area network 130, so that audio signals transmitted from the laptop computer 110D may first reach the local area network 130 via a wireless access point, rather than a network hub. Other communication paths between the laptop computer 110D and the server 105 are also possible, as aspects of the present disclosure are not limited to any particular way in which audio signals are transmitted.

To accommodate the different communication mechanisms used by the devices 110A-D, the meeting server 105 may be coupled to multiple communication interfaces. For instance, the meeting server 105 may be coupled to a telephone interface configured to receive audio signals from the telephone network 115 and process the received audio signals (e.g., by converting the received audio signals into a format suitable for processing by the meeting server 105). Similarly, the meeting server 105 may be coupled to a network interface configured to receive data packets from the Internet 125 or other data communication medium (e.g., an intranet or other network within an enterprise). The received data packets may be processed by one or more network stack components to extract audio signals to be processed by the meeting server 105.

While FIG. 1B shows an illustrative arrangement of the meeting server 105 and devices 110A-D, it should be appreciated that other types of arrangements are also possible, as the concepts of the present disclosure are not limited to any particular manner of implementation.

The meeting server(s) 105 may be implemented in any suitable way, as the concepts described herein are not limited. For example, the meeting server 105 may be implemented on any computer having one or more processors, or distributed across multiple computers. In some embodiments, the meeting server 105 may also be implemented by one or more computers at a cloud computing facility.

Various types of devices having microphones may be used in any suitable combination to provide audio signals to the meeting server 105. In addition to the devices 110A-D shown in FIG. 1B, examples of suitable devices include, but are not limited to, personal digital assistants, tablet computers, desktop computers, portable music players, and the like. The devices may be personal and/or mobile, or may be owned by an entity that provides the meeting space (e.g., a conference room within an enterprise or at a hotel or other conference facility). Some of these devices may not be capable of establishing a connection with a cellular network or a local area network, but may be capable of establishing an ad hoc connection with a peer device so as to transmit audio signals to the meeting server 105 via the peer device. The devices may be arranged in any suitable configuration to capture audio signals during a meeting, although, as discussed in greater detail below, some configurations may be preferred because they may provide better quality audio signals.

Figure 2:
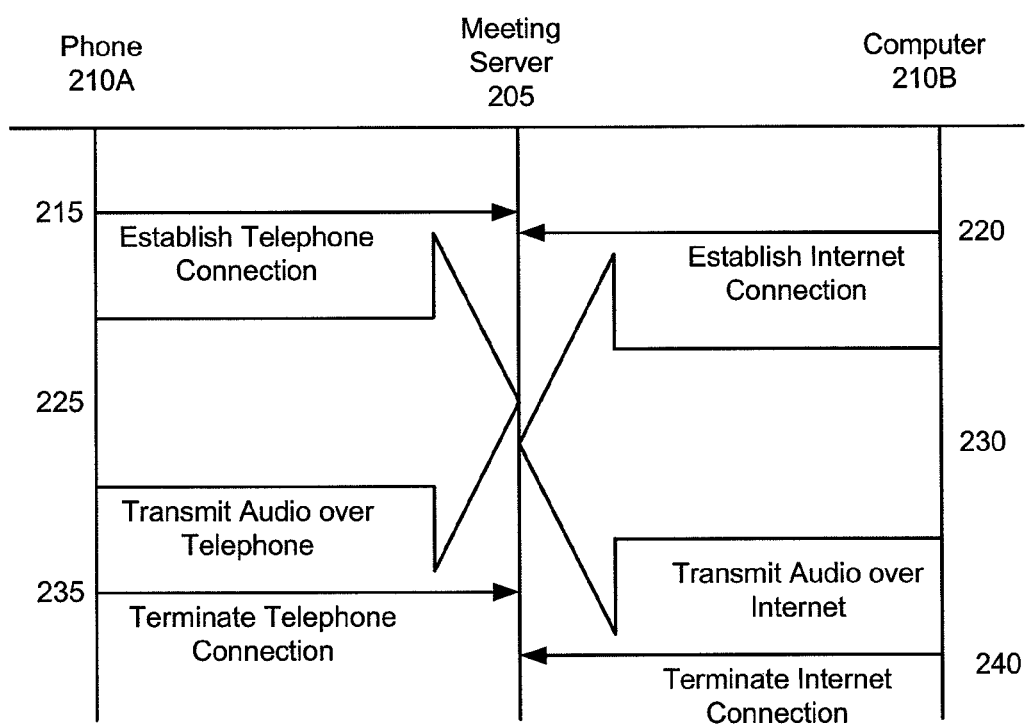
FIG. 2 shows some illustrative communication sequences between a meeting server and two devices having microphones, in accordance with some embodiments.

FIG. 2 shows some illustrative communication sequences between a meeting server 205 and devices 210A-B. In this example, the device 210A may be a phone such as the mobile phone 110B shown in FIG. 1B, and the device 210B may be a computer such as the laptop computer 110D shown in FIG. 1B.

At the beginning of a meeting, a participant may use his device to establish a connection with the meeting server 205. For example, at act 215, a participant may use the phone 210A to call a telephone number associated with the meeting server 205. To allow the meeting server 205 to associate this telephone connection with a particular meeting, the participant may be prompted to provide meeting identification information in any suitable manner, for example, by entering one or more alphanumerical codes using a keypad or a touch screen, or by speaking the alphanumerical codes. In some embodiments, the meeting identification information may include a conference code and/or a participant code, which may be generated by the meeting server 205 in response to a meeting request and may be provided to the participant in any suitable manner, such as by email, voicemail, and/or text messaging. Other ways of associating a connection with a meeting are also possible, as the concepts disclosed herein are not limited to any particular manner of implementation.

As another example, at act 220, a participant may use the computer 210B to establish a connection with the meeting server 205. This participant may be the same as, or different from, the participant who uses the phone 210A to connect with the meeting server 205. For instance, the phone 210A and the computer 210B may be used by the same participant to provide multiple channels of audio to the meeting server 205. Alternatively, the phone 210A and the computer 210B may be used by different participants to participate in the meeting from different locations.

In some embodiments, the computer 210B may have installed thereon client software for communicating with the meeting server 205, in which case the participant may run the client software and request a connection with the meeting server 205 via the client software. Alternatively, or additionally, the meeting server 205 may provide a web interface so that the participant may use a web browser of the computer 210B to establish a connection with the meeting server 205. The participant may be prompted to provide meeting identification information as part of the process of establishing the connection between the computer 210B and the meeting server 205 in any of the ways described above. However, in some embodiments, the computer 210B may automatically search for meeting identification information (e.g., in an electronic calendar stored on the computer 210B) and provide the information to the meeting server 205 with or without user confirmation. In yet some further embodiments, the computer 210B may use one or more suitable location-based services, such as Global Positioning System (GPS), network-based triangulation, and the like, or any other suitable technique to obtain location information to be provided to the meeting server 205, which may use the received location information to identify the meeting. Other ways of identifying a meeting are also possible, as the concepts disclosed herein are not limited to any particular manner of implementation.

Once a connection with the meeting server 205 is established, the phone 210A may, at act 225, transmit audio signals to the meeting server 205. The audio signals may be captured using a microphone associated with the phone 210A, such as an on-board speakerphone or an external microphone connected the phone 210A. Preferably, the microphone may be placed at a location close to one or more participants expected to speak during the meeting, so as to improve the quality of the recorded audio signals. For example, the microphone may be placed on a table, either directly in front of a participant, or between two or more participants sharing the microphone. However, aspects of the present disclosure are not limited to any particular placement. The microphone can be placed in any suitable location for capturing audio signals.

In some instances, the phone 210A may transmit audio signals to the meeting server 205 throughout the duration of the meeting, without interruption. In other instances, the phone 210A may stop transmitting for some period of time and then start transmitting again. For example, a participant may press a "mute" button of the phone 210A any number of times to interrupt the transmission for any duration.

At act 235, a participant may terminate the connection between the phone 210A and the meeting server 205 by terminating the telephone call at the end of the meeting.

Like the phone 210A, the computer 210B may, at act 230, transmit audio signals to the meeting server 205, and, at act 240, terminate the connection with the meeting server 205. In some embodiments, the computer 210B may be equipped with multiple microphones and may be capable of transmitting multiple channels of audio to the meeting server 205. For example, the client software running on the computer 210B or the web application running through a web browser of the computer 210B may be capable of receiving audio signals from different microphones and transmitting the audio signals to the meeting server 205 on separate channels.

In the example shown in FIG. 2, the connection between the phone 210A and the meeting server is established at the beginning of the meeting and terminated at the end of the meeting, and likewise for the connection between the computer 210B and the meeting server 205. While such timing may be typical, it is not required. The meeting server 205 may allow a device to connect to, or disconnect from, a meeting at any suitable time. For example, a participant may join late and/or leave early for whatever reason, and a device associated with that user (e.g., a mobile phone, smartphone, laptop, tablet computer, etc.) may be added to the ad hoc arrangement of microphones in the room after the meeting has begun and/or removed from the ad hoc arrangement before the meeting ends.

Although not shown in FIG. 2, the meeting server 205 may receive audio signals from devices other than the phone 210A and computer 201B. Furthermore, as discussed in greater detail below, in accordance with some embodiments, the meeting server 205 may process the received audio signals in real time (e.g., while the meeting is still on-going), and may provide some form of feedback to the meeting participants while continuing to receive audio signals from the devices, although not all embodiments involve processing in real time and/or providing feedback.

Figure 3A:
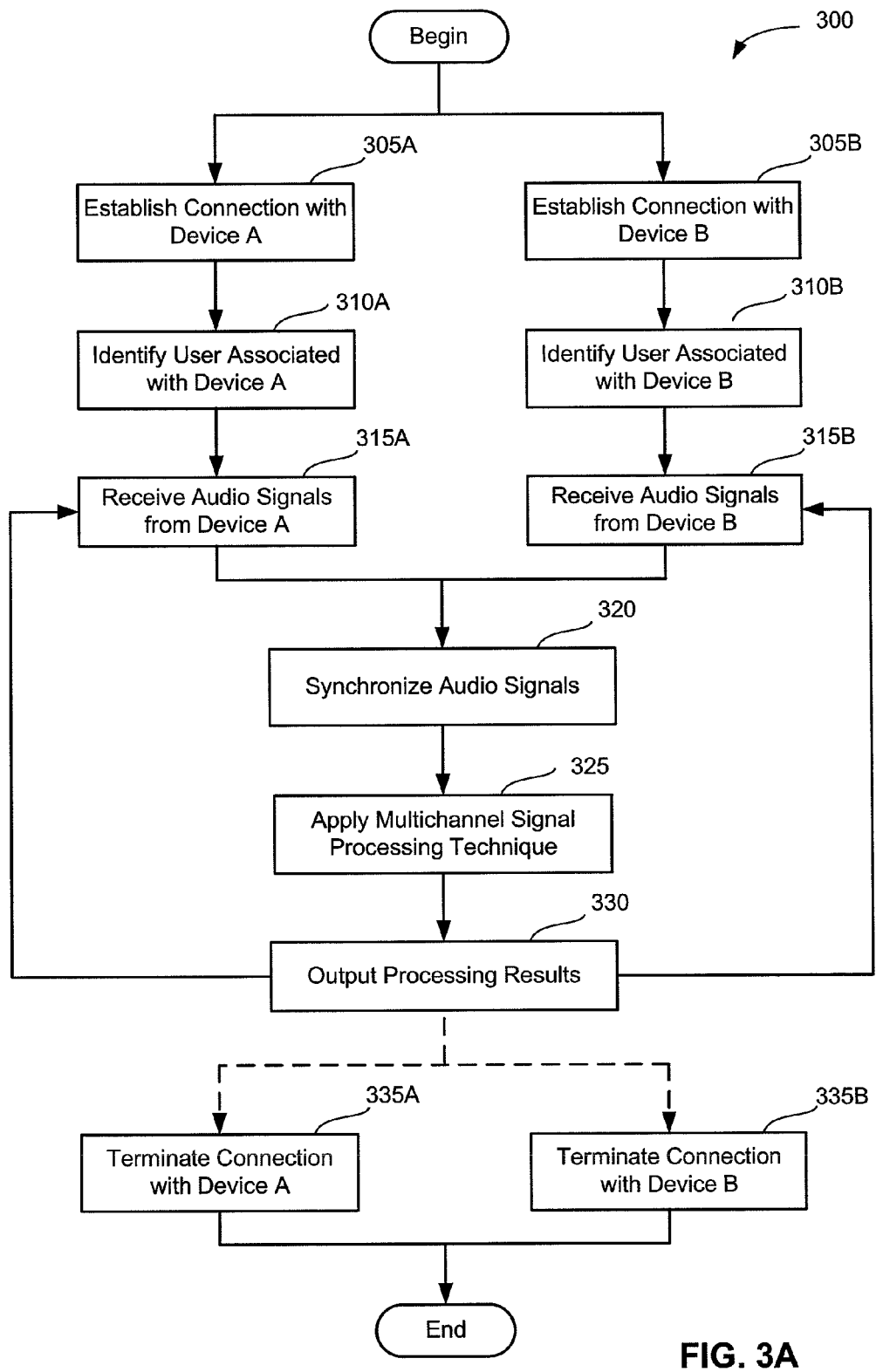
FIG. 3A shows an illustrative process that may be performed by a meeting server to receive and process multiple channels of audio recorded at a meeting, in accordance with some embodiments.

FIG. 3A shows an illustrative process 300 that may be performed by a meeting server (or collection of meeting servers) in accordance with some embodiments of the present disclosure. For example, the process 300 may be performed by the meeting server 105 shown in FIG. 1B to process audio signals received from multiple devices.

At act 305A, the meeting server may receive a request from a device A (e.g., any of devices 110A-D shown in FIG. 1B) to establish a connection. As discussed above, the connection may be a telephone connection through a telephone network, a data connection through the Internet, or any other type of connection through a suitable communication medium.

In some embodiments, the meeting server may receive meeting identification information from the device A as part of the process of establishing the connection (e.g., during an "enrollment phase" of a meeting session). The identification information can take any suitable form as the concepts described herein are not limited in this respect. In some embodiments, the meeting identification information may include an alphanumeric conference code previously assigned by the meeting server (e.g., when a reservation is made to use the services provided by the meeting server) or take any other suitable form. This information may be used by the meeting server to identify which connections are associated with the same meeting, so that audio signals received via those connections may be analyzed in conjunction with each other.

At act 310A, the meeting server may attempt to identify a user associated with the connection that is being established. As explained above, in some embodiments, speaker-dependent models are used during ASR to improve recognition accuracy. In some embodiments, the meeting server may, at least initially, operate under the assumption that audio signals received via this connection contain speech spoken by the identified user, and perform ASR on the audio signals using one or more models associated with the identified user. However, the meeting server is not required to identify a user associated with the connection, nor to assume that the identified user is the speaker whose voice is being captured.

In the embodiments, where the system seeks to identify users, the system may do so in any suitable way. For example, the meeting server may receive at act 305 meeting identification information that includes an alphanumeric participant code, which may allow the meeting server to look up the identity of a corresponding participant. In some further embodiments, a user initiating the connection between a device (e.g., the device A) and the meeting server may be prompted to speak, type, or otherwise enter a name or other user identifier. In yet some further embodiments, the meeting server may prompt the user to speak the meeting identification information and apply one or more speaker recognition processes to the audio signal to determine the identity of the user. In yet some further embodiments, the meeting server may use any available network identification information (e.g., a telephone number in case the device is a phone, an IP address in case the device is a computer, etc.) to infer user identity. In yet some further embodiments, where the connection between the device and the meeting server is established through client software running on the device, the meeting server may receive information from the client software regarding a user account from which the client software is launched, and use the user account information to infer user identity. However, it should be appreciated that these methods are merely examples, as other methods for identifying a user are also possible.

At act 315A, the meeting server may begin receiving audio signals from the device A, and may continue to do so until the connection is terminated at act 335A. In some embodiments, the reception and processing of the audio signals proceed differently depending on the type of connection between the device A and the meeting server. For example, different decoding and/or extraction techniques may be used depending on how the audio signals have been encoded and/or packaged for transmission. Furthermore, if the audio signals have been compressed, different decompression techniques may be applied depending on which compression techniques were used.

In addition to the device A discussed above, the meeting server may receive audio signals from one or more other devices. For example, at acts 305B, 310B, and 315B, the meeting server may establish a connection with device B, identify an associated user, and begin receiving audio signals from the device B. The reception may continue until the connection with the device is terminated at act 335B.

In some embodiments, the meeting server may store audio signals received at acts 315A-B for processing at a later time. For example, the system may provide a meeting transcription service and may perform ASR on the received audio signals at any suitable time (e.g., whenever computing resources become available). Alternatively, or additionally, the meeting server may process the received audio signals in real time. In one embodiment, real time processing includes providing feedback to meeting participants. An example of real time processing and feedback is illustrated at acts 320, 325, and 330 in FIG. 3A. However, it should be appreciated that not all embodiments are limited to performing real time processing.

At act 320, the meeting server may attempt to synchronize multiple channels of audio received from different devices (e.g., by using auto-correlation to identify relative delays between the different channels, or any other suitable technique). Such synchronization may be beneficial for a number of reasons. For instance, the inventors have recognized and appreciated that, as a result of differences in communication media, audio signals captured and transmitted by multiple devices at roughly the same time may arrive at the meeting server at different times (e.g., as much as a few hundred milliseconds apart). For example, between two audio signals both transmitted as telephone traffic, differences in transmission delays may result from different network and/or connection characteristics. Furthermore, transmission delays may vary unpredictably throughout the duration of a meeting because network conditions can change dynamically. As a result, the audio signals may become so misaligned as to impact the effectiveness of the multichannel signal processing techniques applied by the meeting server (such as the techniques discussed below in connection with act 325). Therefore, it may beneficial to identify and compensate for transmission delays.

Additionally, or alternatively, synchronization of multiple channels of audio received from different devices may be performed for reasons other than compensating for transmission delays. In some embodiments, audio signals transmitted as data traffic may have timestamps attached thereto, but such timestamps may be inaccurate due to clock drifts between different network devices (e.g., between the devices from which the audio signals are transmitted, the meeting server, and/or network devices operated by network service providers). Therefore, the meeting server may not be able to rely entirely on the timestamps in determining the relative delay between the audio signals.

For example, user devices may have internal clocks that suffer from skew over time. Rather than changing the devices' internal clocks, which may have undesirable effects on the devices' performance, the meeting server may monitor relative skews between the meeting server's clock and the devices' internal clocks and use the relative skews to better align the audio signals in time. In one embodiment, where at least one audio signal is transmitted with timestamps generated by a sending device, the meeting server may monitor the difference between the timestamp on each received audio frame and the corresponding time of receipt according to the meeting server's clock. When that difference exceeds a certain threshold (e.g., one, two, or three seconds), the meeting server may determine that clock drift may account for a significant portion of the difference and may respond by initiating one or more synchronization procedures. This threshold may be selected based on some appropriate assumptions regarding network delay, such as an assumption that network delay normally does not exceed the selected threshold.

As another example, in an embodiment where some audio signals are transmitted as telephone traffic without timestamps and other audio signals are transmitted as data traffic with timestamps, the meeting server may not have sufficient information to accurately determine the relative delay between the audio signals transmitted as telephone traffic and the audio signals transmitted as data traffic. Accordingly, synchronization may be performed to better align the audio signals received from different devices.

The inventors have further recognized and appreciated that audio signals received from multiple devices may also become misaligned because a speaker may move relative to one or more device microphones during his speech. For example, as the speaker moves towards a first device and away from a second device, it takes less time for the sound waves to reach a microphone of the first device, but more time to reach a microphone of the second device. Similarly, as a device is moved relative to the speaker, it takes a different amount of time for the sound waves to reach a microphone of the device. Accordingly, synchronization may be performed to compensate for these changes.

In some embodiments, synchronization of audio signals received from different devices may be performed one or more times during a meeting session. For example, synchronization may be performed periodically at some suitable interval to ensure that the received audio signals are no more than a maximum time difference (e.g., 200 ms) apart. Alternatively, or additionally, synchronization may be triggered by one or more operating conditions, such as detecting that the received audio signals have drifted too far apart and/or detecting that a device has been moved in the meeting room. Movement can be detected in any suitable way. For example, a user can provide an input to the system (e.g., the meeting server) indicating that a device has been moved. Alternatively, an accelerometer coupled to the device can be used to trigger a similar input to the system.

At act 325, the meeting server may apply one or more multichannel signal processing techniques to the multiple channels of audio received from the devices. In some embodiments, a channel selection algorithm may be applied to two or more channels of audio received from the devices to select a channel having a desired signal quality. For example, a value may computed for each channel representing the likelihood that the particular channel of audio contain speech, and a channel having a highest likelihood value may be selected. Other techniques are also possible, as aspects of the present disclosure are not limited to any particular manner of channel selection.

In some other embodiments, a multichannel enhancement technique may be applied to obtain an audio signal in which an individual speaker's speech is emphasized but other sounds (e.g., noise and/or speech from other speakers) are de-emphasized. An example of such an embodiment is described in greater detail below in connection with FIG. 4.

At act 330, the meeting server may provide real-time feedback to meeting participants based on the processing of audio signals received from the devices. Feedback can take any suitable form, as the concepts described herein are not limited. In some embodiments, where the meeting server provides an online meeting service to allow remote meeting participation, the meeting server may transmit audio signals received from an ad hoc collection of devices to one or more meeting locations to be played through one or more speakers. The transmitted audio signals may be a result of the processing performed at act 325, such as selecting a channel having a desired signal quality, applying a multichannel enhancement technique to directionally focus on a speaker, or some other type of processing.

Figure 3B:
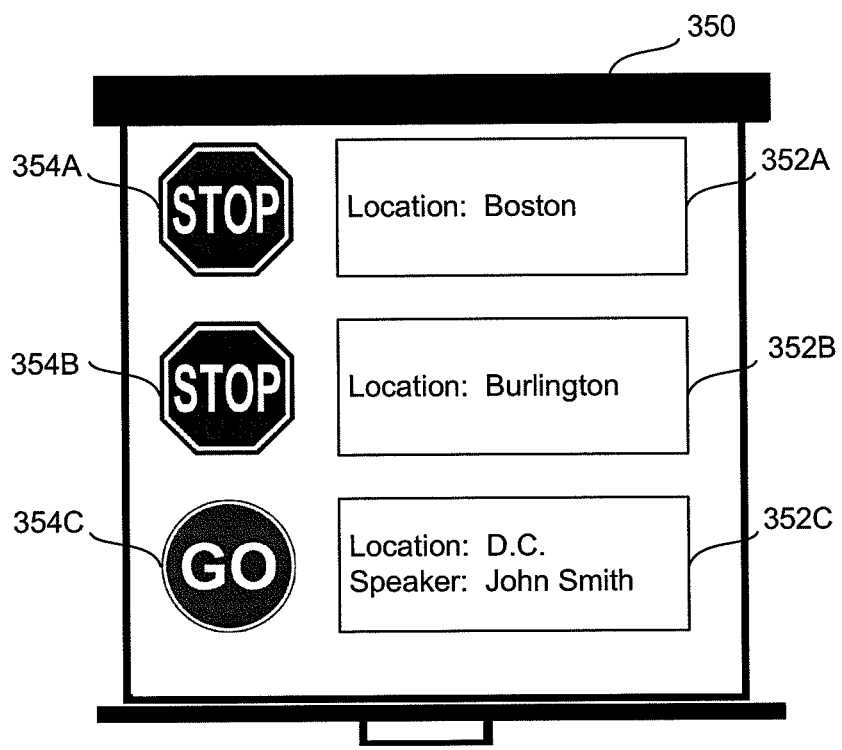
FIGS. 3B-E illustrate various manners in which a system (e.g., a meeting server and/or one or more devices) may indicate in real time an identity of a leading speaker to help meeting participants better follow a live discussion, in accordance with some embodiments.
Figure 3C:
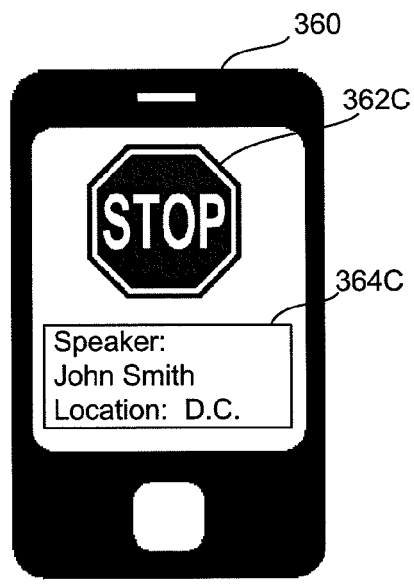
Figure 3D:
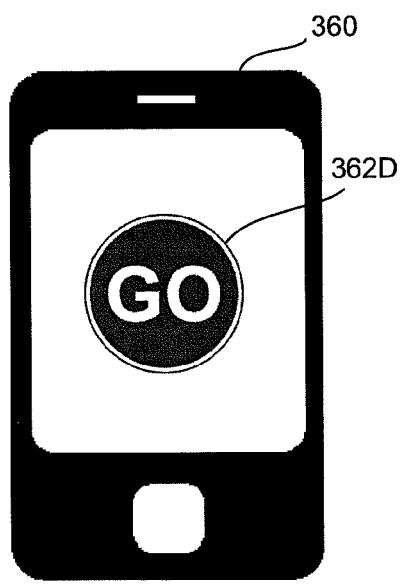

In some further embodiments, the meeting server may analyze the received audio signals to identify a leading speaker (e.g., a speaker whose speech is most clearly captured by the collection of device microphones), and then take any suitable action. For example, the system may give the floor of the meeting to the leading speaker in any suitable manner, such as by displaying visual indications as illustrated in FIGS. 3B-D and discussed in greater detail below. Alternatively, or additionally, the system may transmit an audio signal that filters out other speakers and focuses on the leading speaker. This type of feedback may offer a clue to the other speakers to stop speaking until the leading speaker has finished.

In some further embodiments, the system may determine whether to playback an audio signal focusing on the leading speaker depending on the leading speaker's location. For example, the system may render the leading speaker's speech to remote meeting participants, but not to meeting participants at the same location as the leading speaker.

In the example shown in FIG. 3A, acts 315A-B, 320, 325, and 330 may be performed by the meeting server (or another component of the system) on an on-going basis as long as the devices A and B are connected to the meeting server. Although acts 320, 325, and 330 are shown in FIG. 3A as following acts 315A-B, all of these acts may be performed concurrently, until the devices A and B disconnect from the meeting server at acts 335A-B.

FIGS. 3B-E illustrate various manners in which a system (e.g., a meeting server and/or one or more devices) may indicate in real time an identity of a leading speaker to help meeting participants better follow a live discussion, in accordance with some embodiments. For example, the displays shown in FIGS. 3B-E may be used at act 330 of the process 300 shown in FIG. 3A to provide real-time feedback to meeting participants based on the processing of the audio signals captured at the meeting. However, it should be appreciated that these are merely examples, as other suitable techniques may also be used. For instance, an indication of the identity of the leading speaker may be provided in a non-visual way (e.g., audible, tactile, etc.).

FIG. 3B shows an example of a display 350 that may be used in a meeting room to identity a leading speaker to other meeting participants, in accordance with some embodiments. The display 350 may be a projector screen, a television screen, a computer monitor, or any other suitable display device. The display 350 may be positioned in the meeting room in such a manner as to be viewed by at least some meeting participants, and may be configured to display information received from a meeting server. For example, in an embodiment in which the meeting server is located remotely from the meeting room, the display 350 may be used by a local computer (not shown) to display information received from the meeting server via a network connection. Alternatively, the display 350 may directly receive information from the meeting server for display to the meeting participants.

In the example illustrated in FIG. 3B, textual information may be shown on the display 350 to identify a leading speaker. For instance, the displayed information may include the leading speaker's name, email address, telephone number, and/or other suitable identifier. In an embodiment in which meeting participants participate from different locations, an indication may also be provided to identify the leading speaker's location. For instance, in the example shown in FIG. 3B, the leading speaker is identified at textbox 352C by his name, "John Smith," and his location, "D.C."

In some embodiments, graphical indicia may be provided in addition to textual information to help meeting participants more quickly discern who currently has the floor. For instance, in the example illustrated in FIG. 3B, three groups of participants are participating, respectively, from three different locations, Boston, Burlington, and D.C. A "stop" sign 354A may be displayed next to textbox 352A containing the location "Boston." Similarly, a "stop" signs 354B may be displayed next to textbox 352B containing the location "Burlington." These signs alert participants from Boston and Burlington that they do not currently have the floor. In some embodiments, the "stop" signs and/or the texts "Boston" and "Burlington" may be shown in red to make the alert more effective. Likewise, to emphasize that John Smith from D.C. currently has the floor, a "go" sign 354C may be displayed next to the textbox 352C, and the "go" sign and/or the texts "D.C." and "John Smith" may be shown in green. However, it should be appreciated that the indicia "stop" and "go" are merely illustrative, as other suitable indicia can alternatively be used.

Figure 3E:
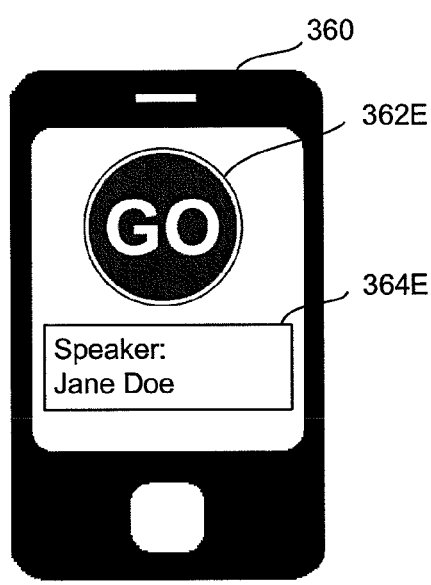

FIGS. 3C-E show an another example of a display 360 that may be used to identify a leading speaker to another meeting participant using information received from a meeting server, in accordance with some embodiments. The display 360 may be associated with a device used by a meeting participant to establish a connection with a meeting server. For example, the display 360 may be the display screen of a smartphone or laptop computer used to capture speech from the meeting participant and to transmit the captured speech to the meeting server, as discussed above in connection with FIG. 3A.

The connection between the meeting server and the device associated with the display 360 may be of any suitable type. For example, the connection may include a data connection such as an Internet Protocol (IP) connection, so that information is transmitted between the meeting server and the device via data packets such as IP packets. However, it should be appreciated that other types of network connections may also be established between the meeting server and the device.

In the example shown in FIG. 3C, the meeting participant associated with the display 360 does not currently have the floor. Accordingly, a red "stop" sign 362C is displayed together with a textbox 364C identifying the leading speaker (e.g., by location, "D.C.," and name, "John Smith"). Again, it should be appreciated that the indicia "stop" and "go" are merely illustrative, as other suitable indicia can alternatively be used.

The identity of a leading speaker may be determined by the meeting server using any of the speaker identification techniques discussed herein, and may be transmitted from the meeting server for display on the display 360, for example, via a network connection (e.g., an IP connection) that is different from a conventional telephone connection. For example, in some embodiments, the identification of a leading speaker may depend on information other than, or in addition to, a source from which audio signals are received. For example, a leading speaker may be identified not only based on a telephone number from which audio signals are received, but also by applying one or more speaker identification techniques to the received audio signals. This ability to distinguish different speakers based on the audio signals themselves may be advantageous in an embodiment where multiple speakers' speech is received from the same source (e.g., when multiple meeting participants speak through the same telephone connection). In such an embodiment, the identified leading speaker may be different from the person associated with the source of speech (e.g., the owner of a mobile phone that captures and transmits the audio signals). Furthermore, the identified leading speaker may change over time, as different speakers start and stop speaking throughout a meeting session.

In the example shown in FIG. 3D, the leading speaker has finished speaking and no one currently has the floor. Accordingly, a green "go" sign 362D is displayed without identifying any leading speaker, to indicate that any participant may begin speaking without interrupting others.

In the example shown in FIG. 3E, the meeting server determines that the participant associated with the display 360 currently has the floor. Accordingly, a green "go" sign 362E is displayed together with a textbox 364E identifying the leading speaker (e.g., by name, "Jane Doe"). The identification of the leading speaker may be helpful in an event that multiple participants share the device associated with the display 360.

It should be appreciated that the displays 350 and 360 shown in FIGS. 3B-E are merely illustrative, as other types of displays may also be suitable. Furthermore, different items of information may be displayed in addition, or instead of, those shown in FIGS. 3B-E. For example, a leading speaker may be identified by not only name and location, but also an organization (e.g. company, university, etc.) to which the leading speaker is affiliated. Further still, the displayed information may be arranged in a different manner, as aspects of the present disclosure are not so limited.

Figure 4:
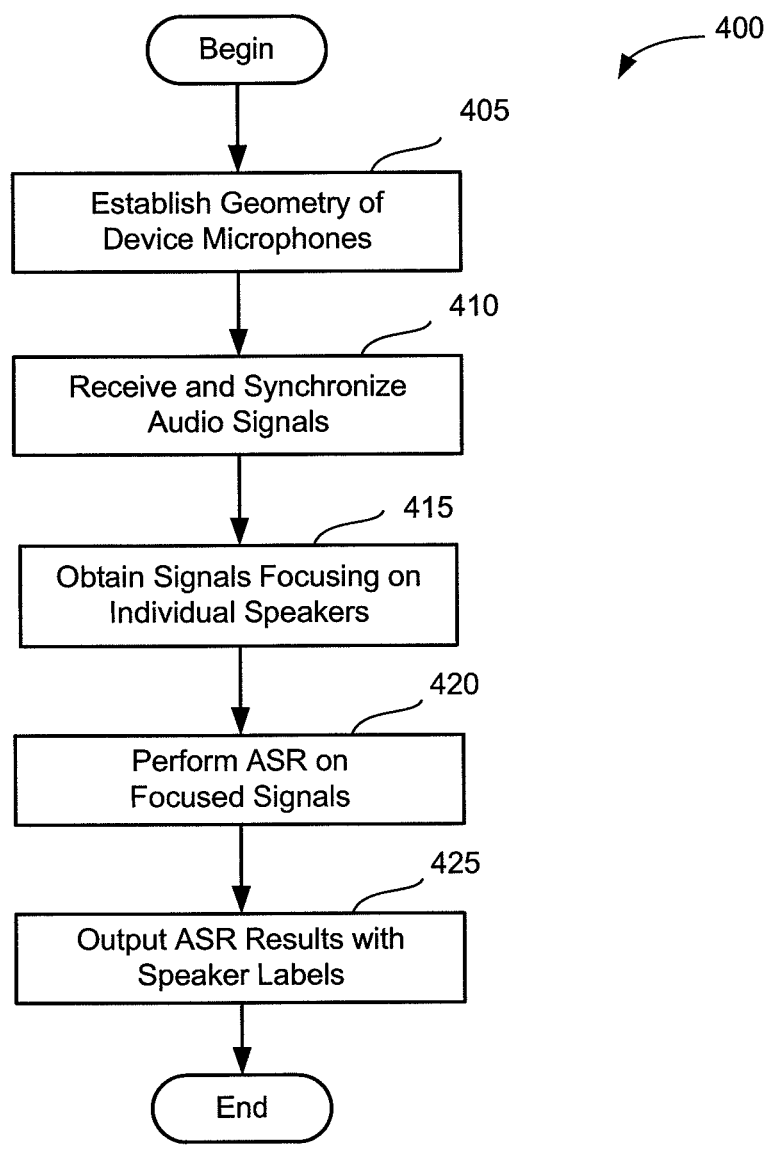
FIG. 4 shows an illustrative process that may be performed by a meeting server to perform ASR processing, in accordance with some embodiments.

FIG. 4 shows an illustrative process 400 that may be performed by a meeting server (or another component of the system) in accordance with some embodiments, to process the received audio signals to focus on a single speaker's voice. For example, the process 300 may be performed by a meeting server as part of the process 300 shown in FIG. 3A to process audio signals received from an ad hoc group of devices.

As discussed above, a meeting server (or some other component of the system) may, in some embodiments, apply one or more multichannel signal processing techniques to multiple channels of audio provided by device microphones. Unlike conventional microphone arrays that rely upon a fixed geometry (e.g., number, position, and spacing) of the microphones in the array, in some embodiments an ad hoc arrangement of devices may be formed using any number of devices having microphones. The number and/or types of devices used may be unknown prior to the beginning of the meeting, and the devices may be arranged in an unknown manner. For example, any number of the device microphones may be placed on a conference table of any suitable shape (e.g., round, oval, or rectangular), and at any suitable angle and/or distance from each other, or may be positioned in other locations in an area (i.e., not all on a same conference table).

Some multichannel signal processing techniques, such as beamforming, benefit from knowledge of the geometry of the collection of microphones that capture the audio signals. For example, while one or more parameters of a beamforming algorithm (e.g., delay parameters to be applied to respective audio signals prior to summing the signals) may be selected without a priori knowledge of microphone array geometry, such knowledge may be used to select the parameters more quickly and/or with less computation. Accordingly, in some embodiments, the meeting server may attempt to obtain information regarding the geometry of the collection of microphones from one or more sources other than the audio signals themselves.

Furthermore, some microphone array geometries may be preferred over others for reasons of better signal quality and/or computational simplicity. For example, some beamforming techniques may benefit from microphones that are at most a fraction of one wavelength apart. For a 1 kHz signal, one wavelength is about 13.5 inches, so that the microphones in the microphone array may be at most a few inches apart (e.g., one, two, three, four, five, or six inches apart). The microphones may also be arranged in a line, although a linear arrangement is not required.

Therefore, in some embodiments, a meeting server may recommend to meeting participants one or more preferred geometric arrangements for the device microphones to be used to capture audio signals during a meeting. Suggestions can be made in any suitable way. For example, the system may provide written instructions that suggest how to lay out microphones for any given number of devices. As another example, the system can output (e.g., via one or more registered devices) synthesized speech containing such instructions. As yet another example, the system can gather information from devices regarding positioning (e.g., using a GPS capability, or by analyzing test audio signals captured by the devices to estimate geometry of the devices, where the test audio signals may contain speech or other types of sound) and give feedback regarding suggested changes. Any of these or other techniques may be used either along or in combination, as the concepts described herein are not limited in this respect.

Any movement of device microphones relative to each other and/or relative to meeting participants during a meeting may impact the performance of a multichannel signal processing technique such as beamforming. Therefore, in some embodiments, the multichannel signal processing technique may be dynamically adapted, for example, by adjusting one or more processing parameters based on any newly detected microphone array geometry. Such on-the-fly adjustment may be done periodically, or may be triggered by some operating condition, such as automatically detecting that one or more devices have been moved, added, or removed during a meeting, or receiving user input indicating that such a change has occurred. Additionally, to reduce the need for dynamic adaptations that may be computationally intensive, meeting participants may, in some instances, be advised to refrain from moving the device microphones during the meeting.

In the example shown in FIG. 4, a meeting server may, at act 405, attempt to obtain information regarding the geometry of device microphones to be used to provide audio signals to the meeting server. For instance, when a meeting participant attempts to establish a connection between a device and the meeting server at the beginning of a meeting, he may be prompted to roughly describe the conference room setting, such as the shape and/or size of a conference table, the number and/or distribution of participants seated at the table, and/or the number of available devices. In some embodiments, a graphical user interface is provided to assist the meeting participant in entering this information. However, the concepts described herein are not limited to the use of a graphical user interface, as other techniques can also be used. For example, alternatively, or additionally, one or more still and/or moving images of the conference room may be captured and transmitted to the meeting server for use in estimating various geometric parameters of the conference room.

Based on the collected information, the meeting server may compute one or more recommended arrangements of device microphones and display the recommendations to the meeting participant. The meeting participant may accept one of the recommendations, or reject all of them. It should be understood that not all embodiments are limited to the system providing recommendations to participants regarding the geometry of device microphones.

As discussed above, in some embodiments, the meeting server may prompt the meeting participant to indicate the actual arrangement of the device microphones, which may be used to facilitate the selection of suitable signal processing parameters. This may be done in an embodiment in which the system suggests a geometry, or in an embodiment in which no suggestion is made. Also, not all embodiments require user input as the system can discern geometry in other ways. For example, the system may determine the number of microphones based on the number of devices registered. Additionally, the system may use GPS information and/or test audio signals to discern geometry of the device microphones.

At act 410, the meeting server may receive audio signals from multiple devices and synchronize the received audio signals in any suitable way, examples of which are described above in connection with acts 315A-B and 320 of FIG. 3A.

At act 415, the meeting server may process the synchronized audio signals to determine whether the audio signals likely include simultaneous speech of multiple speakers and, if so, estimate a number of speakers that are likely to be speaking simultaneously. In some embodiments, the meeting server may then apply a multichannel enhancement technique (e.g., beamforming) with different parameters to obtain multiple audio signals, each of which emphasizes speech from a different speaker and therefore may be treated as a focused channel for that speaker. In other embodiments, the meeting server may apply a channel selection technique to obtain a focused channel for each speaker, for example, as discussed above in connection with act 325 of FIG. 3A.

In some embodiments, the meeting server may further label each focused channel with a user identifier. This may be done in any suitable manner. For example, in some embodiments, the meeting server identifies an actual channel of audio received from a device that correlates most closely with the focused channel, and a user identifier associated with the device providing the identified actual channel of audio (e.g., as determined at acts 310A-B of FIG. 3A) may be used to labeled the focused channel. The meeting server may employ one or more speaker recognition techniques to confirm whether a focused channel is correctly labeled with a user identity. This may be beneficial in a situation where multiple focused channels are associated with an actual channel (e.g., when multiple speakers are talking into the same microphone). In other embodiments, the meeting server may determine a user identity directly from the focused channel using one or more speaker recognition techniques, without identifying any actual channel of audio. As discussed above, speaker identification can be done in any suitable manner, as the concepts described herein are not limited in this respect.

At act 420, the meeting server may perform ASR processing on one or more of the focused channels obtained at act 415. As discussed above, in some embodiments, a speaker-dependent model is used if a focused channel is associated with a user identifier. If the system is not confident with the result of speaker identification, a default speaker-independent model may be used. In addition, in some embodiments, the system does not use any speaker-dependent models, so only speaker-independent models are used. Also, as discussed above, not all embodiments involve performing ASR processing.

At act 425, the meeting server outputs transcription results (e.g., by storing them for later retrieval, by transmitting them to one or more meeting locations or other desired location, etc.) In some embodiments, the meeting server may use timestamps associated with the audio signals to interleave transcription results so that the words and sentences in the transcription results appear in a single transcript in the same order in which the words and sentences were spoken during the meeting. In some further embodiments, the meeting server may label transcription results in a manner that identifies which transcription result corresponds to the speech of which speaker. This may be accomplished in any suitable way, for example, by labeling the transcription results with some suitable information identifying the focused channels, such as names, user identifiers, phone numbers, and the like. An example is illustrated below.

[Speaker: John Smith]: "Are we ready to begin the meeting?"

[Speaker: 888-888-8888]: "We are ready in Boston. What about the folks from Burlington?"

[Speaker: Speaker on A. D. Jones's channel; but not A. D. Jones]: "We are here."

[Speaker: JaneDoe@XXX.com]: "Great. Let's get started."

While specific implementations of various inventive concepts of the present disclosure are discussed above in connection with FIG. 4, it should be appreciated that other manners of implementation are also be possible. For instance, any of the processing tasks discussed above may be distributed to any combination of one or more system components. In some embodiments, a single device may be equipped with multiple microphones and may receive instructions from the meeting server to apply multichannel signal processing techniques, such as channel selection, blind source separation, or beamforming, to captured audio signals. Thus, some of the processing performed by the meeting server at act 415 of FIG. 4 may be distributed to a device. The meeting server may send to the device any suitable information to assist the signal processing, including, but not limited to, additional audio signals, associated user identities, and/or information regarding geometry of microphones.

ASR processing may also be distributed to ASR applications running on one or more devices (e.g., the devices 110A-D shown in FIG. 1B). For example, rather than performing ASR processing at act 420 of FIG. 4, the meeting server may transmit to one or more devices a focused channel of audio obtained at act 415, so that the ASR applications of the devices may perform ASR processing on the focused channel of audio.

Figure 5:
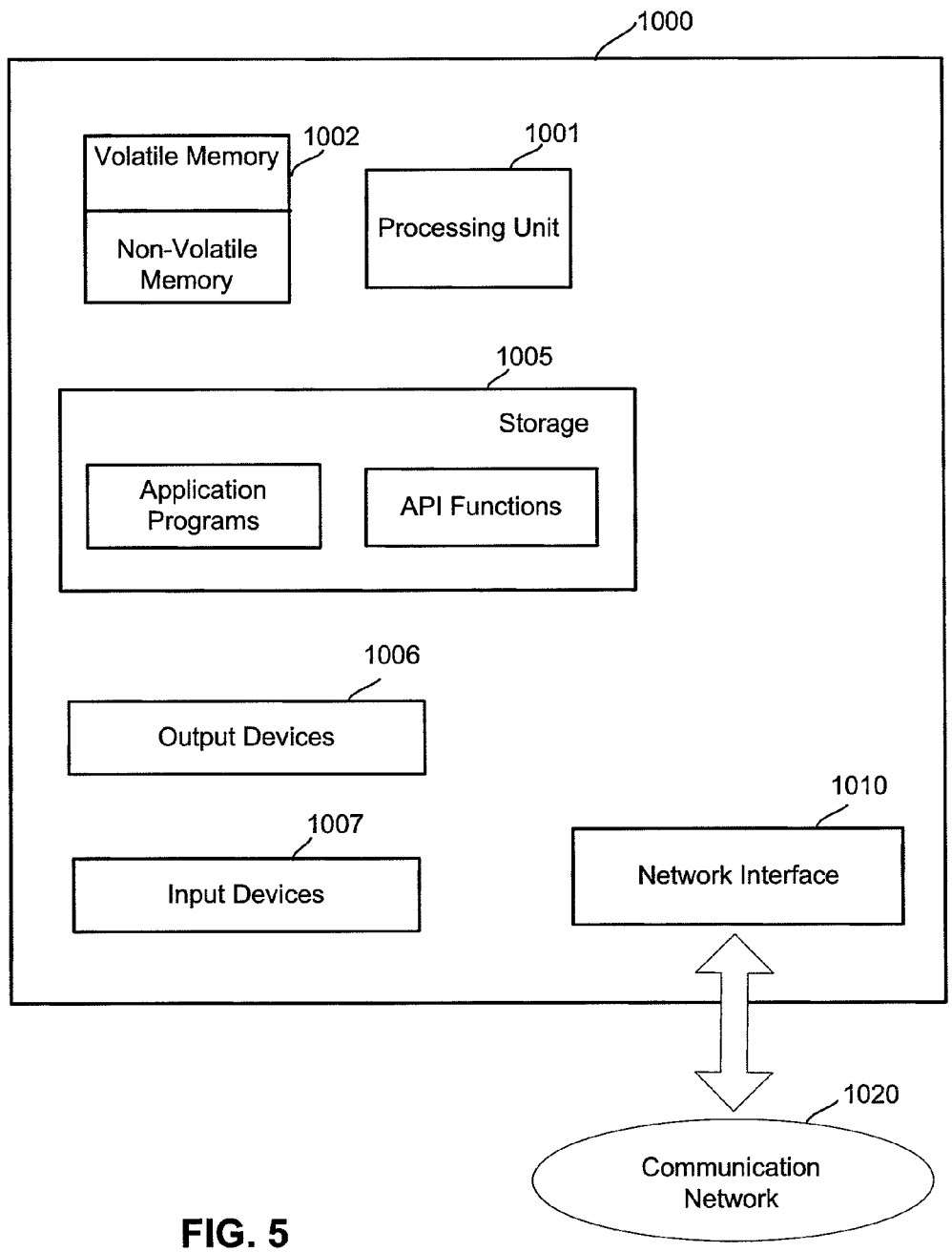
FIG. 5 shows, schematically, an illustrative computer on which various inventive aspects of the present disclosure may be implemented.

FIG. 5 shows, schematically, an illustrative computer 1000 on which any of the aspects of the present invention described herein may be implemented. For example, the computer 1000 may be a mobile device on which any of the features described in connection with the illustrative devices 110A-D shown in FIG. 1B may be implemented. The computer 1000 may also be used in implementing a meeting server or other component of the system.

As used herein, a "mobile device" may be any computing device that is sufficiently small so that it may be carried by a user (e.g., held in a hand of the user). Examples of mobile devices include, but are not limited to, mobile phones, pagers, portable media players, e-book readers, handheld game consoles, personal digital assistants (PDAs) and tablet computers. In some instances, the weight of a mobile device may be at most one pound, one and a half pounds, or two pounds, and/or the largest dimension of a mobile device may be at most six inches, nine inches, or one foot. Additionally, a mobile device may include features that enable the user to use the device at diverse locations. For example, a mobile device may include a power storage (e.g., battery) so that it may be used for some duration without being plugged into a power outlet. As another example, a mobile device may include a wireless network interface configured to provide a network connection without being physically connected to a network connection point.

In the embodiment shown in FIG. 5, the computer 1000 includes a processing unit 1001 that includes one or more processors and a non-transitory computer-readable storage medium 1002 that may include, for example, volatile and/or non-volatile memory. The computer 1000 may also include other types of non-transitory computer-readable medium, such as storage 1005 (e.g., one or more disk drives) in addition to the system memory 1002. The memory 1002 may store one or more instructions to program the processing unit 1001 to perform any of the functions described herein. The memory 1002 may also store one or more application programs and/or Application Programming Interface (API) functions.

The computer 1000 may have one or more input devices and/or output devices, such as devices 1006 and 1007 illustrated in FIG. 5. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, the input devices 1007 may include a microphone (e.g., the microphone 105 shown in FIG. 3A) for capturing audio signals, and the output devices 1006 may include a display screen for visually rendering, and/or a speaker for audibly rendering, recognized text (e.g., the recognized text produced by the ASR engine 120 shown in FIG. 3A).

As shown in FIG. 5, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. Such alterations, modifications, and improvements are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present invention may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising acts of:
   receiving, by a server, a plurality of representations of at least one audio signal captured during a meeting attended by a plurality of participants, each representation of the plurality of representations being generated by at least one corresponding microphone of a plurality of microphones and being received via a separate communication path, the plurality of microphones being disposed in a multiple-microphone setting so that the at least one audio signal is captured by at least two of the plurality of microphones, at least one of the plurality of microphones being a microphone of a mobile device, wherein a location of every microphone relative to every other microphone of the plurality of microphones is unknown to the server prior to a beginning of the meeting; and
   processing, by the server, the plurality of representations of the at least one audio signal to obtain a processed representation of the at least one audio signal, wherein the act of processing the plurality of representations comprises:
      detecting, based on an input other than the plurality of representations of the at least one audio signal, movement of at least one of the plurality of microphones; and
      in response to detecting movement of at least one of the plurality of microphones, shifting, in time, at least one first representation of the plurality of representations at least in part by performing auto-correlation processing on the at least one first representation and at least one second representation of the plurality of representations.

2. The method of claim 1, wherein each of the plurality of microphones is associated with at least one corresponding mobile device of a plurality of mobile devices.

3. The method of claim 2, wherein a first mobile device of the plurality of mobile devices is personal to a first user, and a second mobile device of the plurality of mobile devices is personal to a second user different from the first user.

4. The method of claim 1, wherein the act of processing the plurality of representations comprises acts of:
   assessing at least one quality of the plurality of representations of the at least one audio signal; and
   selecting, as the processed representation, at least one representation from the plurality of representations based at least in part on the at least one quality.

5. The method of claim 1, wherein the act of processing the plurality of representations comprises an act of applying at least one signal enhancement technique to the plurality of representations to obtain the processed representation of the at least one audio signal.

6. The method of claim 1, wherein:
   each of the plurality of microphones corresponds to one of a plurality of devices present at the meeting; and
   the plurality of devices are arranged in an ad hoc array that is not constrained to a fixed geometry.

7. The method of claim 6, wherein at least one of the plurality of devices is unknown prior to the beginning of the meeting.

8. The method of claim 6, wherein a total number of devices in the plurality of devices is unknown prior to the beginning of the meeting.

9. The method of claim 6, wherein the ad hoc array has a first geometry at the beginning of the meeting, and wherein the method further comprises:
   rearranging, during the meeting, the plurality of devices so that the ad hoc array has a second geometry different from the first geometry.

10. At least one non-transitory computer readable medium having encoded thereon computer executable instructions for causing at least one computer to perform a method comprising acts of:
    receiving, by a server, a plurality of representations of at least one audio signal captured during a meeting attended by a plurality of participants, each representation of the plurality of representations being generated by at least one corresponding microphone of a plurality of microphones and being received via a separate communication path, the plurality of microphones being disposed in a multiple-microphone setting so that the at least one audio signal is captured by at least two of the plurality of microphones, at least one of the plurality of microphones being a microphone of a mobile device, wherein a location of every microphone relative to every other microphone of the plurality of microphones is unknown to the server prior to a beginning of the meeting; and
    processing, by the server, the plurality of representations of the at least one audio signal to obtain a processed representation of the at least one audio signal, wherein the act of processing the plurality of representations comprises:
       detecting, based on an input other than the plurality of representations of the at least one audio signal, movement of at least one of the plurality of microphones; and in response to detecting movement of at least one of the plurality of microphones, shifting, in time, at least one first representation of the plurality of representations at least in part by performing auto-correlation processing on the at least one first representation and at least one second representation of the plurality of representations.

11. The at least one non-transitory computer readable medium of claim 10, wherein the act of processing the plurality of representations comprises acts of:
assessing at least one quality of the plurality of representations of the at least one audio signal; and
selecting, as the processed representation, at least one representation from the plurality of representations based at least in part on the at least one quality.

12. The at least one non-transitory computer readable medium of claim 10, wherein the act of processing the plurality of representations comprises an act of applying at least one signal enhancement technique to the plurality of representations to obtain the processed representation of the at least one audio signal.

13. A system comprising:
a server comprising at least one processor programmed to:
receive a plurality of representations of at least one audio signal captured during a meeting attended by a plurality of participants, each representation of the plurality of representations being generated by at least one corresponding microphone of a plurality of microphones and being received via a separate communication path, the plurality of microphones being disposed in a multiple-microphone setting so that the at least one audio signal is captured by at least two of the plurality of microphones, at least one of the plurality of microphones being a microphone of a mobile device, wherein a location of every microphone relative to every other microphone of the plurality of microphones is unknown to the server prior to a beginning of the meeting; and
process the plurality of representations of the at least one audio signal to obtain a processed representation of the at least one audio signal, wherein the at least one processor is programmed to process the plurality of representations at least in part by:
detecting, based on an input other than the plurality of representations of the at least one audio signal, movement of at least one of the plurality of microphones; and
in response to detecting movement of at least one of the plurality of microphones, shifting, in time, at least one first representation of the plurality of representations at least in part by performing auto-correlation processing on the at least one first representation and at least one second representation of the plurality of representations.

14. The system of claim 13, wherein the at least one processor is programmed to process the plurality of representations at least in part by:
assessing at least one quality of the plurality of representations of the at least one audio signal; and
selecting, as the processed representation, at least one representation from the plurality of representations based at least in part on the at least one quality.

15. The system of claim 13, wherein the at least one processor is programmed to process the plurality of representations at least in part by applying at least one signal enhancement technique to the plurality of representations to obtain the processed representation of the at least one audio signal.

16. The system of claim 13, further comprising a plurality of devices, wherein:
each of the plurality of microphones corresponds to one of the plurality of devices present at the meeting; and
the plurality of devices are arranged in an ad hoc array that is not constrained to a fixed geometry.

* * * * *